US010902674B2

(12) United States Patent
Kawaguchi

(10) Patent No.: US 10,902,674 B2
(45) Date of Patent: Jan. 26, 2021

(54) CREATING A GEOMETRIC MESH FROM DEPTH DATA USING AN INDEX INDENTIFYING UNIQUE VECTORS

(71) Applicant: Axell Corporation, Tokyo (JP)

(72) Inventor: Hideyo Kawaguchi, Tokyo (JP)

(73) Assignee: AXELL CORPORATION, Tokyo (JP)

( * ) Notice: Subject to any disclaimer, the term of this patent is extended or adjusted under 35 U.S.C. 154(b) by 0 days.

(21) Appl. No.: 16/415,823

(22) Filed: May 17, 2019

(65) Prior Publication Data

US 2019/0371058 A1  Dec. 5, 2019

(30) Foreign Application Priority Data

Jun. 4, 2018 (JP) .................................. 2018-106963

(51) Int. Cl.
*G06T 17/20* (2006.01)
*G06T 7/536* (2017.01)

(52) U.S. Cl.
CPC .............. *G06T 17/20* (2013.01); *G06T 7/536* (2017.01); *G06T 2207/10028* (2013.01); *G06T 2207/20021* (2013.01)

(58) Field of Classification Search
None
See application file for complete search history.

(56) References Cited

U.S. PATENT DOCUMENTS

| 2007/0008091 | A1 | 1/2007 | Takenaga et al. |
| 2013/0106852 | A1* | 5/2013 | Woodhouse ........... H04N 19/96 |
| | | | 345/423 |
| 2013/0271459 | A1 | 10/2013 | Gary |
| 2014/0185669 | A1 | 7/2014 | Zhang et al. |
| 2018/0033194 | A1* | 2/2018 | Goel ....................... G06T 15/06 |

FOREIGN PATENT DOCUMENTS

JP  2006-344009 A  12/2006

OTHER PUBLICATIONS

Taiwanese Office Action issued for Taiwanese Application No. 108116873 dated Apr. 21, 2020, Total 7 pages.
The Extended European Search Report dated Sep. 18, 2019 in European Patent Application No. 19175968.7, 14 pages.

(Continued)

*Primary Examiner* — Steven Z Elbinger
(74) *Attorney, Agent, or Firm* — Masuvalley & Partners

(57) ABSTRACT

A unit that divides an image into a mesh shape and acquires depth information and an X-coordinate and a Y-coordinate for vertices of each grid, a unit that transforms vertex data into three-dimensional space coordinates expressed by a predetermined coordinate system, a unit that calculates line segment vectors and a normal vector that constitute each grid based on the three-dimensional space coordinates of each vertex, a vector management part that assigns indexes for distinguishing unique vectors from each other to the respective unique vectors, and generates a vector list in which the unique vectors and the indexes are respectively associated with each other, and a unit that stores therein indexes of the vectors that constitute each grid, while being associated with the grid.

10 Claims, 14 Drawing Sheets

(56) References Cited

OTHER PUBLICATIONS

Peng, Jingliang et al., "Technologies for 3D Mesh Compression: A Survey", Journal of Visual Communication and Image Representation, Apr. 16, 2005, pp. 688-733, Elsevier, Inc, 46 pages.

Mekuria, Rufael et al., "Real-Time Encoding of Live Reconstructed Mesh Sequences for 3D Tele-Immersion", Jul. 15, 2013, pp. 1-6, International Conference on Multimadia and Expo Workshops, 6 pages.

Tomas Akenine-Moller et al, Real-Time Rendering, Chapter 2: The Graphics Rendering Pipeline; Chapter 14: Acceleration Algorithms; Chapter 18: Graphics Hardware ED, Jan. 1, 2008, pp. 11-27, 645-664, 833-835, XP-002698047, 40 pages.

\* cited by examiner

FIG.6A

LINE SEGMENT VECTORS OUTPUT OF EACH GRID (RAW DATA)

| GRID NUMBER 00 | GRID NUMBER 01 | GRID NUMBER 02 | GRID NUMBER 03 | ... |
|---|---|---|---|---|
| U:$(x_0,y_0,z_0)$<br>V:$(x_1,y_1,z_1)$<br>W:$(x_2,y_2,z_2)$ | U:$(x_0,y_0,z_0)$<br>V:$(x_3,y_3,z_3)$<br>W:$(x_4,y_4,z_4)$ | U:$(x_5,y_5,z_5)$<br>V:$(x_6,y_6,z_6)$<br>W:$(x_2,y_2,z_2)$ | U:$(x_0,y_0,z_0)$<br>V:$(x_1,y_1,z_1)$<br>W:$(x_7,y_7,z_7)$ | |
| GRID NUMBER 10 | GRID NUMBER 11 | ... | | |
| U:$(x_0,y_0,z_0)$<br>V:$(x_3,y_3,z_3)$<br>W:$(x_4,y_4,z_4)$ | U:$(x_0,y_0,z_0)$<br>V:$(x_3,y_3,z_3)$<br>W:$(x_4,y_4,z_4)$ | | | |
| ... | | | | |

FIG.6B

LINE-SEGMENT VECTOR LIST

| INDEX | LINE SEGMENT |
|---|---|
| 0 | $(x_0, y_0, z_0)$ |
| 1 | $(x_1, y_1, z_1)$ |
| 2 | $(x_2, y_2, z_2)$ |
| 3 | $(x_3, y_3, z_3)$ |
| 4 | $(x_4, y_4, z_4)$ |
| 5 | $(x_5, y_5, z_5)$ |
| 6 | $(x_6, y_6, z_6)$ |
| 7 | $(x_7, y_7, z_7)$ |
| ⋮ | ⋮ |

FIG.7A

NORMAL VECTORS OUTPUT OF EACH GRID (RAW DATA)

| GRID NUMBER 00 | GRID NUMBER 01 | GRID NUMBER 02 | GRID NUMBER 03 | ... |
|---|---|---|---|---|
| A: $(x_a, y_a, z_a)$<br>B: $(x_b, y_b, z_b)$ | A: $(x_a, y_a, z_a)$<br>B: $(x_b, y_b, z_b)$ | A: $(x_c, y_c, z_c)$<br>B: $(x_d, y_d, z_d)$ | A: $(x_b, y_b, z_b)$<br>B: $(x_e, y_e, z_e)$ | |
| GRID NUMBER 10 | GRID NUMBER 11 | ... | | |
| A: $(x_f, y_f, z_f)$<br>B: $(x_g, y_g, z_g)$ | A: $(x_f, y_f, z_f)$<br>B: $(x_g, y_g, z_g)$ | | | |
| ... | | | | |

FIG.7B

NORMAL VECTOR LIST

| INDEX | NORMAL VECTOR |
|---|---|
| a | $(x_a, y_a, z_a)$ |
| b | $(x_b, y_b, z_b)$ |
| c | $(x_c, y_c, z_c)$ |
| d | $(x_d, y_d, z_d)$ |
| e | $(x_e, y_e, z_e)$ |
| f | $(x_f, y_f, z_f)$ |
| g | $(x_g, y_g, z_g)$ |
| ⋮ | ⋮ |

FIG.8

MESH DATA STORED IN A MESH-DATA STORAGE PART

| GRID NUMBER | RAW COORDINATES OF VERTEX P (VIEWING COORDINATE SYSTEM) | | | LINE VECTOR (INDEX) | | | NORMAL VECTOR (INDEX) | |
|---|---|---|---|---|---|---|---|---|
| | x | y | z | U | V | W | A | B |
| 00 | $x_{00}$ | $y_{00}$ | $z_{00}$ | 0 | 1 | 2 | a | b |
| 01 | $x_{01}$ | $y_{01}$ | $z_{01}$ | 0 | 3 | 4 | a | b |
| 02 | $x_{02}$ | $y_{02}$ | $z_{02}$ | 5 | 6 | 2 | c | d |
| 03 | $x_{03}$ | $y_{03}$ | $z_{03}$ | 0 | 1 | 7 | b | e |
| ⋮ | | | | ⋮ | ⋮ | ⋮ | ⋮ | ⋮ |

CREATING A GEOMETRIC MESH FROM DEPTH DATA USING AN INDEX INDENTIFYING UNIQUE VECTORS

RELATED APPLICATIONS

This application claims priority to Japanese Patent Application No. 2018-106963 filed Jun. 4, 2018, entitled Image Processing Apparatus, Image Processing Method, And Image Processing Program, which is hereby incorporated herein by reference in its entirety.

FIELD

Embodiments described in the present specification relate to an apparatus, a method, and a program that process an image having depth information obtained from a depth camera or the like, and more particularly relate to an image processing apparatus, an image processing method, and an image processing program that are capable of improving calculation efficiency and reducing data amount by restoring a three-dimensional space from a two-dimensional image and converting depth information into geometry information.

BACKGROUND

A depth image in which each pixel has a pixel value corresponding to a distance (or a depth) from a reference point has been used in various technical fields, such as detection and avoidance of obstacles by an automobile or a robot, or AR (Augmented Reality) and VR (Virtual Reality).

Japanese Patent Application Laid-open No. 2006-344009 discloses a vehicle surrounding monitoring method and a vehicle surrounding monitoring system that create an object arrangement model in which an object is arranged on a three-dimensional space based on a depth image and use the depth image for monitoring the surroundings of a vehicle.

SUMMARY

In some usage fields of depth images, there are cases where unprocessed depth information obtained from a depth image includes information that is unnecessary for obtaining the ultimate result of calculation. Further, when required calculation is performed based on unprocessed depth information each time, the calculation becomes complicated and a very large amount of data has to be processed, resulting in degradation of the calculation efficiency.

The present invention has been achieved in view of the problem described above, and an object of the invention is to improve the calculation efficiency when depth information is used.

In order to solve the above problem, the present invention provides an image processing apparatus that processes an image including depth information in each pixel, the image processing apparatus comprising: an image division unit that divides the image into a mesh shape of a plurality of polygons; a vertex-data acquisition unit that acquires the depth information and an X-coordinate and a Y-coordinate on the image that are associated with each vertex of each of the polygons as first coordinates of the each vertex; a coordinate transformation unit that transforms the first coordinates of the each vertex into three-dimensional space coordinates expressed by a predetermined coordinate system; a vector calculation unit that calculates element vectors that constitute each of the polygons based on the three-dimensional space coordinates of the each vertex; a vector-list generation unit that respectively assigns, to unique element vectors among the element vectors, element indexes for distinguishing the unique element vectors from each other so as to generate a vector list in which the unique element vectors and the element indexes are respectively associated with each other; and a mesh-data storage unit that stores therein the element indexes of the element vectors that constitute the each polygon, while being associated with the each polygon.

According to an embodiment, three-dimensional space coordinates obtained from an image are converted into element vectors that are geometric information, and therefore it is possible to improve the calculation efficiency when depth information is used.

The object and advantages of the invention will be realized and attained by means of the elements and combinations particularly pointed out in the claims.

It is to be understood that both the foregoing general description and the following detailed description are exemplary and explanatory and are not restrictive of invention, as claimed.

BRIEF DESCRIPTION OF THE DRAWINGS

FIG. 2A is a diagram illustrating a visible light image of a subject captured by a camera, and FIG. 2B is a diagram illustrating a depth image corresponding to FIG. 2A.

FIG. 6A is a diagram illustrating raw data of line segment vectors output while being associated with each grid, and FIG. 6B is a diagram illustrating a line-segment vector list generated based on FIG. 6A.

FIG. 7A is a diagram illustrating raw data of a normal vector output while being associated with each grid, and FIG. 7B is a diagram illustrating a normal vector list generated based on FIG. 7A.

FIG. 8 is a diagram illustrating an example of mesh data stored in a mesh-data storage part.

DESCRIPTION OF EMBODIMENTS

The present invention is described below in detail using embodiments illustrated in the accompanying drawings. Note that, unless otherwise specified, constituent elements, types, combinations, shapes, relative arrangements, and the like described in the following embodiments are merely illustrative examples, and not to be construed as limiting the scope of the present invention only to these elements.

An image processing apparatus according to an embodiment of the present invention has a characteristic in restoring a world space, which uses a specific position (such as a viewpoint of a depth camera) as a reference from a depth image (a distance image or a depth map) and converting information regarding the restored world space into geometry information (vector information) to generate a list, thereby enabling storage of the information and various types of calculation using the information to be efficiently performed.

First Embodiment

Figure 1:
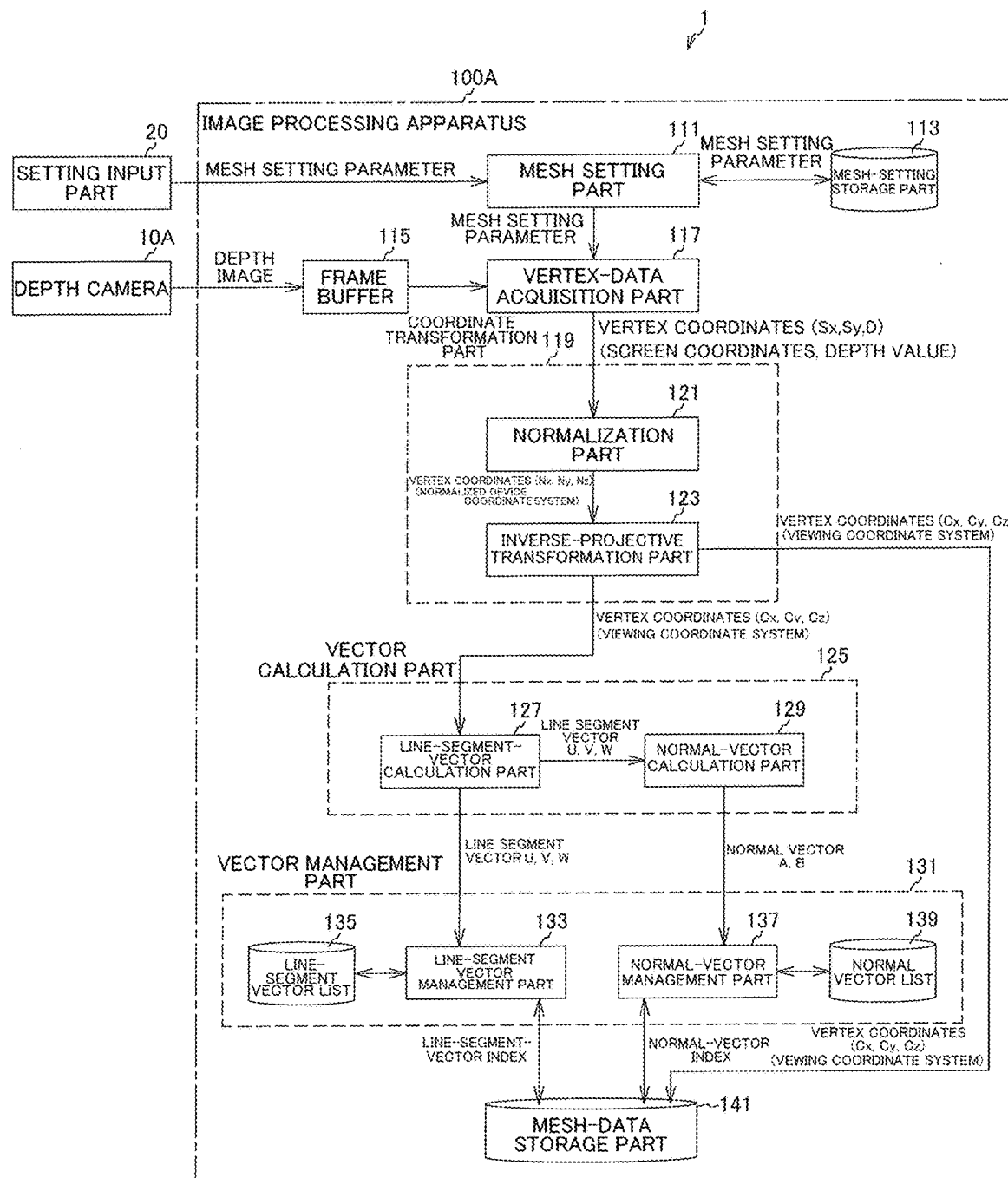
FIG. 1 is a block configuration diagram illustrating an image processing system including an image processing apparatus according to a first embodiment of the present invention.

FIG. 1 is a block configuration diagram illustrating an image processing system including an image processing apparatus according to a first embodiment of the present invention.

Figure 2A:
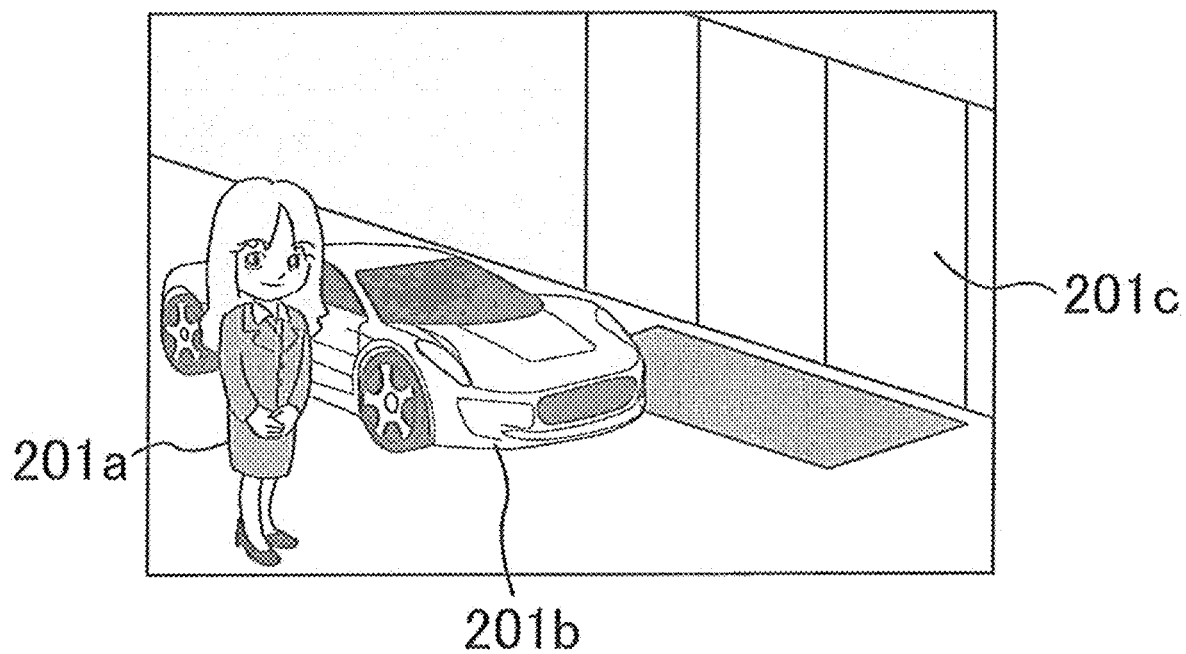
FIGS. 2A and 2B are explanatory diagrams of images to be processed by the image processing apparatus, where
Figure 2B:
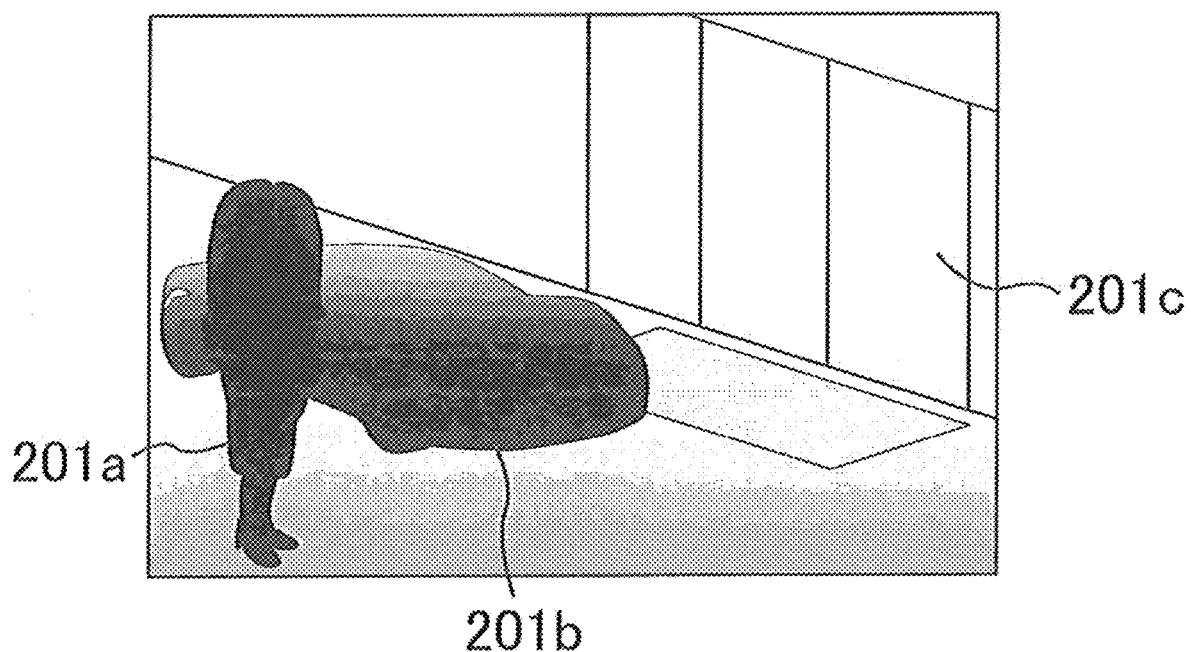

FIGS. 2A and 2B are explanatory diagrams of images to be processed by the image processing apparatus, where FIG. 2A is a diagram illustrating a visible light image of a subject captured by a camera, and FIG. 2B is a diagram illustrating a depth image corresponding to FIG. 2A.

An image processing system 1 includes an image processing apparatus 100A, a depth camera 10A connected to the image processing apparatus 100A, and a setting input part 20. The depth camera (depth-sensing camera) 10A and the setting input part 20 are described first, and the image processing apparatus 100A will be described later.

The depth camera (distance image sensor) 10A is a unit that captures a depth image that is an image including depth information of a subject as illustrated in FIG. 2B. In the depth image, a depth value is associated as depth information with each pixel. The depth value included in each pixel is information indicating a distance from the viewpoint of the depth camera 10A to the subject, and the depth value may be expressed directly by a physical unit such as meter, or may be expressed by the distance from the viewpoint of the depth camera 10A to the subject normalized in a range from 0 to 1. In the depth image illustrated in the drawings, the depth value is expressed by normalized expression so as to be 0 (black) at the closest point to the depth camera 10A and 1 (white) at the farthest point.

It suffices that the depth camera 10A can capture depth images. The principle of acquiring a depth value by the depth camera 10A is not limited to any specific means. For example, the depth camera 10A may be a stereo camera that measures the distance to a subject by a triangulation method based on parallax images of the subject. Alternatively, the depth camera 10A may be a TOF (Time Of Flight) camera that radiates laser light to a subject and measures the distance to the subject based on a time until reflected light of the laser light is detected. It is needless to mention that the depth camera 10A may measure the distance to the subject with other methods.

For example, the depth camera 10A may be a unit that only acquires a depth value such as a laser range finder, or a unit that simultaneously acquires visible light images (RGB images) of a subject and depth information of the subject such as an RGB depth camera (a camera with a depth sensor). The depth camera 10A may further include a configuration that acquires information such as temperature information and information regarding the amount of radiation dose of the subject. Each pixel of an image output from the depth camera 10A may also include information other than depth information (additional information).

The setting input part 20 is a unit that inputs a mesh setting parameter to the image processing apparatus 100A. The setting input part 20 is configured by, for example, a keyboard, a mouse, a touch panel, or various types of buttons.

[Hardware Configuration of Image Processing Apparatus]

The image processing apparatus 100A is configured as a generally-used computer.

Figure 3:
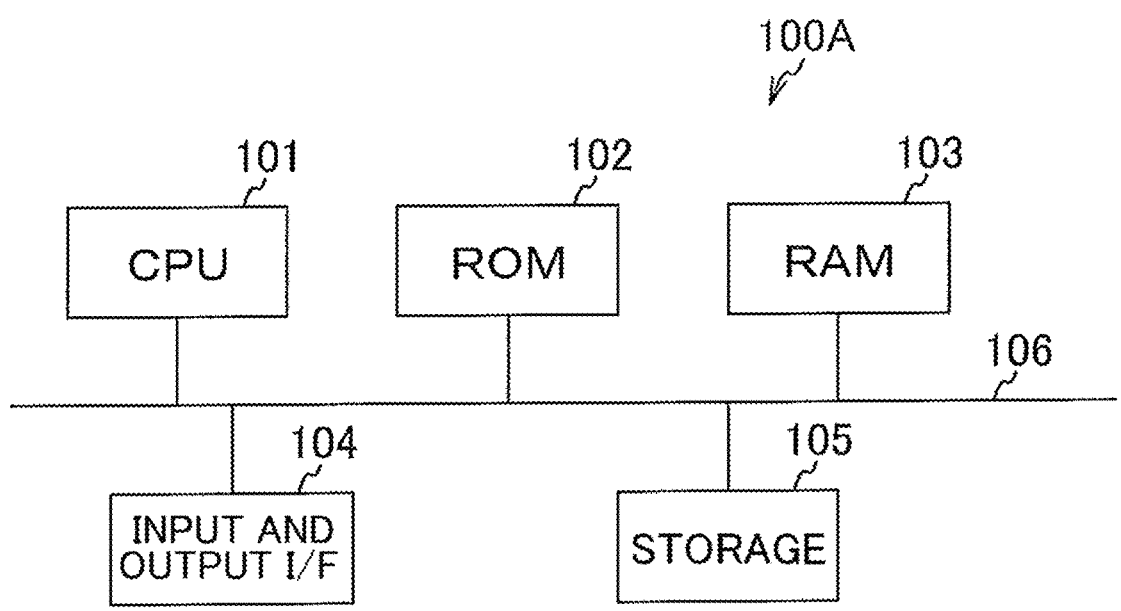
FIG. 3 is a block diagram illustrating a hardware configuration of the image processing apparatus according to the first embodiment of the present invention.

FIG. 3 is a block diagram illustrating a hardware configuration of the image processing apparatus according to the first embodiment of the present invention.

The image processing apparatus 100A includes, for example, a CPU (Central Processing Unit) 101, a ROM (Read Only Memory) 102, a RAM (Random Access Memory) 103, an input and output 104, a storage 105, and a bus 106. These constituent elements are electrically connected to one another via the bus 106.

The CPU 101 controls the entire image processing apparatus 100A by using programs and the like stored in the ROM 102. The ROM 102 is a nonvolatile storage unit that stores therein a control program for causing the CPU 101 to perform a process of controlling the entire image processing apparatus 100A.

The above control program may be stored in the storage 105 included in the image processing apparatus 100A. The above control program may be stored in an external storage device or a recording medium that is connected via the input and output I/F 104. The external storage device is, for example, a nonvolatile storage unit such as an HOD (Hard Disk Drive) and an SSD (Solid State Drive). The recording medium is, for example, a nonvolatile recording medium such as an SD memory card, an FD (Floppy Disk), a CD (Compact Disc), a DVD (Digital Versatile Disk), a BD (Blu-ray® Disk), and a flash memory.

The RAM 103 is a volatile storage unit that temporarily stores therein programs, data, and the like read from the ROM 102. The CPU 101 reads out a control program from the ROM 102 and loads the program on the RAM 103 at the time of activation, and executes the control program by using the RAM 103 as a workspace, thereby realizing various types of functions.

The input and output I/F 104 is an interface that connects the depth camera 10A and the setting input part 20 to the image processing apparatus 100A.

For example, the storage 105 is a nonvolatile storage unit such as an HDD and an SSD. The storage 105 stores therein the control program described above, various types of settings, and the like.

[Functional Configuration of Image Processing Apparatus]

Referring back to FIG. 1, the image processing apparatus 100A includes a mesh setting part 111, a mesh-setting storage part 113, a frame buffer 115, a vertex-data acquisition part (image division unit and vertex-data acquisition unit) 117, a coordinate transformation part (coordinate transformation unit) 119, a vector calculation part (vector calculation unit) 125, a vector management part (vector-list generation unit) 131, and a mesh-data storage part (mesh-data storage unit) 141.

The mesh setting part 111, the frame buffer 115, the vertex-data acquisition part 117, the coordinate transformation part 119, the vector calculation part 125, and the vector management part 131 are implemented as the CPU 101 illustrated in FIG. 3 loads and executes a control program on the RAM 103. The mesh-setting storage part 113 and the mesh-data storage part 141 are implemented by the storage 105 illustrated in FIG. 3.

<Mesh Setting Part and Mesh-Setting Storage Part>

The mesh setting part 111 receives input of a mesh setting parameter from the setting input part 20 and stores the input mesh setting parameter in the mesh-setting storage part 113. Also, the mesh setting part 111 supplies the input mesh setting parameter to the vertex-data acquisition part 117.

The mesh setting parameter is information for specifying a dividing method of dividing a depth image into a mesh shape formed by a plurality of polygons. For example, when a depth image is divided into quadrilateral grid shapes (a plurality of rectangles), the mesh setting parameter can have information regarding the number of divisions in the X direction of the depth image and the number of divisions in the Y direction.

The mesh setting parameter may be information for dividing a depth image into a mesh of polygons other than quadrilateral grids (such as triangles, pentagons, and hexagons). As information for dividing a depth image into a plurality of polygons having a predetermined shape, the mesh setting parameter includes information required for dividing the depth image, for example, the shape and size of a polygon obtained by division, coordinates of a pixel used as a reference for starting division, and the numbers of divisions in the X and Y directions.

<Frame Buffer>

The frame buffer 115 temporarily retains a depth image (FIG. 2B) input from the depth camera 10A. The frame buffer 115 is a memory area (a depth buffer) that is prepared for storing therein a depth value of each pixel of the depth image.

For example, a depth value normalized in a range from 0 to 1 is stored in the frame buffer 115. The depth value may be expressed to be 0 (black) at the closest position to the depth camera 10A and 1 (white) at the farthest position, or may be expressed to be 1 (white) at the closet position to the depth camera WA and 0 (black) at the farthest position.

The frame buffer 115 may store a depth value that is a distance from the viewpoint of the depth camera 10A to a subject directly expressed by a physical unit such as meter.

<Vertex-Data Acquisition Part>

The vertex-data acquisition part 117 divides a depth image acquired from the frame buffer 115 into a mesh shape of a plurality of polygons in accordance with a mesh setting parameter, and gives each of the polygons generated by division identification information (such as an identification number) for identifying the polygon.

The vertex-data acquisition part 117 then acquires coordinates of pixels (vertex coordinates, first coordinates) located at vertices of each polygon from the divided depth image. The vertex coordinates include an X-coordinate on a screen of a pixel located at a vertex (a, screen coordinate Sx, unit: pixel), a Y-coordinate thereof (a screen coordinate Sy, unit: pixel), and a depth value D included in the pixel ($0 \leq D \leq 1$).

For at least one of a plurality of vertices of one polygon, the vertex-data acquisition part 117 associates its vertex coordinates, as coordinates of a vertex belonging to the polygon, with identification information for identifying the polygon. Particularly, the vertex-data acquisition part 117 associates vertex coordinates of a vertex located at a predetermined position of a polygon, as data of a vertex that indicates the origin of the polygon (or a vertex that represents the polygon), with identification information of the polygon.

For example, when the depth image is an image of 640×480 pixels and the mesh setting parameter indicates the number of divisions in the X direction is 64 and the number of divisions in the Y direction is 48", the vertex-data acquisition part 117 divides the depth image into square grids of 10×10 pixels in accordance with the mesh setting parameter. The vertex-data acquisition part 117 assigns a grid number (identification information) for identifying each grid obtained by division to the grid.

The vertex-data acquisition part 117 then acquires the screen coordinates (Sx, Sy) and the depth value D of pixels located at vertices of each grid as vertex coordinates. The vertex-data acquisition part 117 further associates vertex coordinates of an upper left vertex of each grid with a grid number while regarding the vertex as indicating the origin of the grid.

<Coordinate Transformation Part>

The coordinate transformation part 119 is a unit that performs predetermined coordinate transformation for vertex coordinates to restore a world space that has a specific viewpoint as a reference (an origin) based on a depth image. The coordinate transformation part 119 includes a normalization part (normalization unit) 121 and an inverse-projective transformation part (inverse-projective transformation unit) 123.

The normalization part 121 normalizes each value of vertex coordinates to transform the vertex coordinates into three-dimensional space coordinates expressed by a normalized device coordinate system. That is, the normalization part 121 transforms the screen coordinates (Sx, Sy) of each vertex into normalized coordinates (Nx, Ny) that are normalized in a range from −1 to 1 by using the width and the height of a depth image (unit: pixel). The normalization part 121 also transforms the depth value D that is expressed in normalized expression in a range from 0 to 1 into a normalized coordinate (Nz) that is normalized in a range from −1 to 1. Also in the case where the depth value D is a value of a distance from the viewpoint of the depth camera 10A to a subject that is expressed directly by a physical unit such as meter, the normalization part 121 transforms the depth value D into the normalized coordinate Nz by using a clip distance of the depth camera 10A in a similar manner.

In this manner, the normalization part 121 generates the three-dimension space coordinates (Nx, Ny, Nz) expressed by a normalized device coordinate system, as coordinates of each vertex.

The inverse-projective transformation part 123 performs inverse projective transformation (inverse projection transformation) for the vertex coordinates (Nx, Ny, Nz) transformed to those in the normalized device coordinate system, thereby transforming the vertex coordinates into coordinates in a viewing coordinate system that is expressed by using a specific viewpoint as a reference (an origin). The viewing coordinate system is an orthogonal coordinate system. With this coordinate transformation, a world space including an object taken in a depth image is restored with a specific viewpoint regarded as a reference.

For example, the inverse-projective transformation part 123 transforms the normalized vertex coordinates (Nx, Ny, Nz) into vertex coordinates (Cx, Cy, Cz) in a camera coordinate system that uses the viewpoint of the depth camera 10A as a reference. The inverse-projective transformation part 123 stores generated coordinate data (Cx, Cy, Cz) of each vertex in the mesh-data storage part 141 while being associated with a polygon to which the vertex belongs, that is, being associated with identification information (a grid number when polygons are quadrilateral grids) for identifying the polygon.

Figure 4:
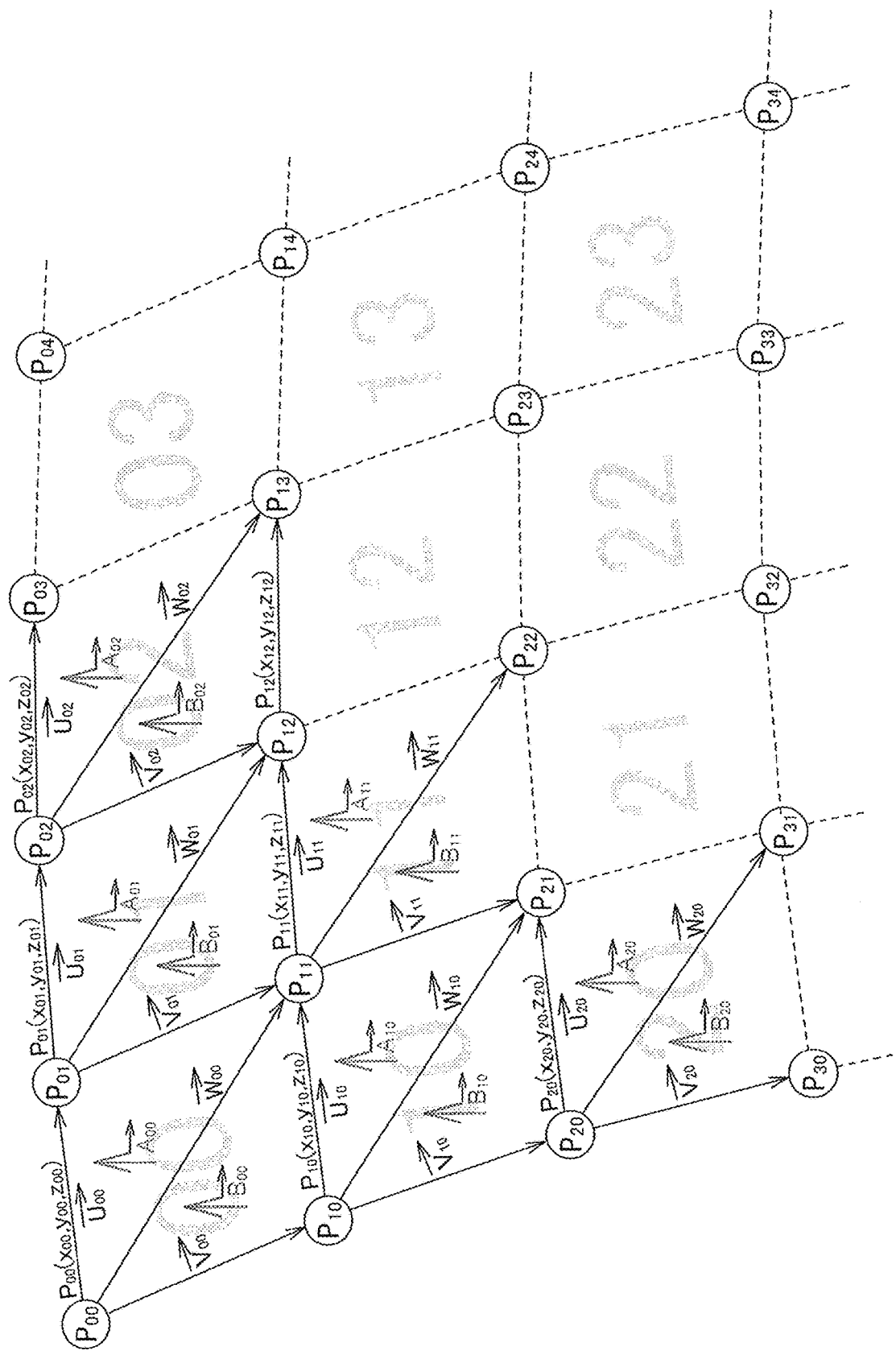
FIG. 4 is a schematic diagram for explaining a state of meshes, vertex coordinates, and vectors to be calculated in a restored world space.

FIG. 4 is a schematic diagram for explaining a state of meshes, vertex coordinates, and vectors to be calculated in a restored world space.

For example, the inverse-projective transformation part 123 stores vertex coordinates (x00, y00, z00) of an upper left vertex P00 of a grid with a grid number 00 in FIG. 4, which are expressed in a camera coordinate system, in the mesh-data storage part 141 while being associated with the grid number 00 (see FIG. 8). Also with regard to grid numbers 01, 02, . . . , the inverse-projective transformation part 123 sequentially stores vertex coordinates of upper left vertices P01, P02, . . . of grids with those grid numbers in the mesh-data storage part 141 while being associated with the grids in a similar manner.

The inverse-projective transformation part 123 outputs generated coordinate data (Cx, Cy, Cz) of each vertex to a line-segment-vector calculation part 127 of the vector calculation part 125.

<<Projective Transformation>>
Projective Transformation of a Coordinate System is Described Here.

Figure 5A:
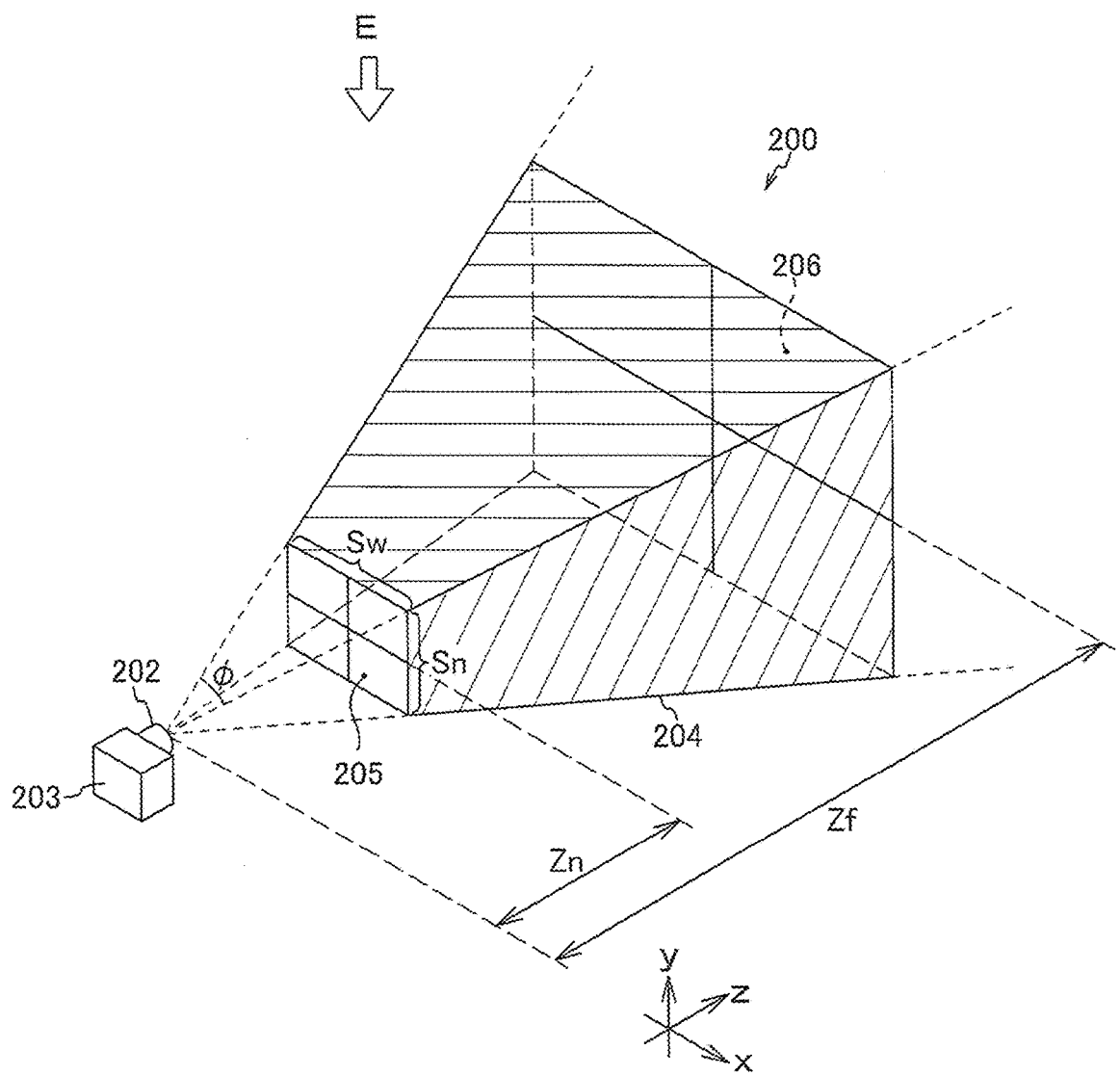
FIGS. 5A and 5B are schematic diagrams for explaining projective transformation.
Figure 5B:
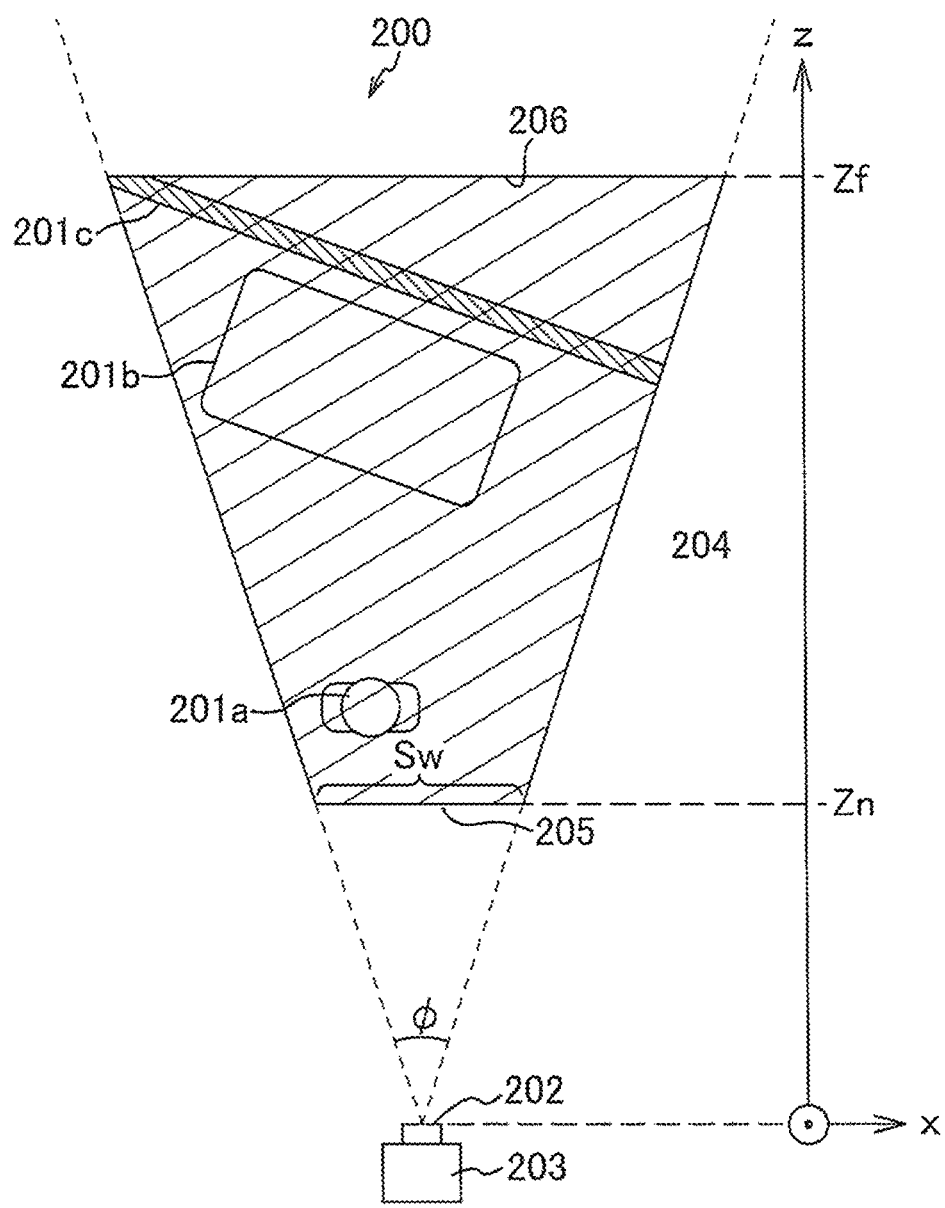

FIGS. 5A and 5B are schematic diagrams for explaining projective transformation. FIG. 5A is a perspective view illustrating a relation between a camera and a frustum, and FIG. 5B is a top view (as viewed in a direction of an arrow E in FIG. 5A) illustrating the relation between the camera and the frustum.

Generally, in 3DCG, a three-dimensional space in its entirety to be handled is referred to as "world space 200", and a coordinate system that expresses the world space 200 is referred to as "world coordinate system".

When objects 201 (201a, 201b, 201c) that exist in the world space 200 illustrated in FIG. 5B are observed from a certain reference point 202 (a viewpoint), the object 201a that is close to the reference point is observed as being larger and the objects 201b and 201c that are far from the reference point are observed as being smaller, as illustrated in FIG. 2A. In a case of generating an image that appears as if the objects 201 existing in the world space 200 are captured by a camera 203 of which the viewpoint is the reference point 202, coordinate transformation (projective transformation or projection transformation) is performed, which extracts a portion of the world space 200 by a frustum 204 (a view volume) including the objects 201a, 201b, and 201c as illustrated in FIGS. 5A and 5B. Transformation of three-dimensional space coordinates uses a 4×4 matrix including x, y, and z and also includes w (an expansion rate).

In this case, it is assumed that a distance from the camera 203 to a front clip face 205 of the frustum 204 is Zn, a distance from the camera 203 to a rear clip face 206 of the frustum 204 is Zf, a width of the front clip face 205 is Sw, and a height of the front clip face 205 is Sh.

A projective transformation matrix (a projection matrix) that transforms coordinates in the world space 200 into coordinates on a screen image observed from the camera 203 (screen coordinates) is expressed by an equation (1).

$$M_{proj} = \begin{pmatrix} \frac{2Z_n}{S_w} & 0 & 0 & 0 \\ 0 & \frac{2Z_n}{S_h} & 0 & 0 \\ 0 & 0 & \frac{Z_f}{Z_f - Z_n} & 1 \\ 0 & 0 & -\frac{Z_f \times Z_n}{Z_f - Z_n} & 0 \end{pmatrix}$$ Equation (1)

Here, assuming that an angle of the view of the camera 203 is φ) and an aspect ratio (Sw/Sh) of the camera 203 is aspect, the equation (1) is deformed as follows.

$$M_{proj} = \begin{pmatrix} \frac{1}{\tan\frac{\varphi}{2}} & 0 & 0 & 0 \\ 0 & \frac{1}{\tan\frac{\varphi}{2}} \times aspect & 0 & 0 \\ 0 & 0 & \frac{Z_f}{Z_f - Z_n} & 1 \\ 0 & 0 & -\frac{Z_f \times Z_n}{Z_f - Z_n} & 0 \end{pmatrix}$$ Equation (2)

As described above, when the angle of the view φ (viewing angle information) and the aspect ratio of the camera 203 and a depth of a space to be captured by the camera 203 (a clip distance) are specified, projective transformation can be made.

<<Inverse Projective Transformation>>
A depth image acquired by the image processing apparatus 100A from the depth camera 10A corresponds to a screen image obtained by projective transformation described above. That is, it is possible to restore a world space from a depth image by performing an inverse operation to projective transformation described above by using a depth value that is depth information with the viewpoint of a camera regarded as a reference.

In order to restore a world space from a depth image, it suffices to perform inverse projective transformation that is an increase operation to projective transformation. A matrix used in this case is an inverse matrix (an inverse projective transformation matrix) of the projective transformation matrix expressed by the equation (1) or the equation (2). That is, when an angle of the view φ and an aspect ratio of the camera 203 and a depth of a space to be captured by the camera 203 (a clip distance) are specified, inverse projective transformation can be made.

<Vector Calculation Part>
Referring back to FIG. 1, the vector calculation part 125 is a unit that calculates an element vector of an element constituting each polygon. First element vectors obtained from vertex coordinates can include, for example, a line segment vector representing a line segment corresponding to a side of a polygon, a surface normal vector that is perpendicular to a surface of a polygon, and a vertex normal vector obtained by adding surface normals of polygons that share each vertex.

In this example, the vector calculation part 125 includes the line-segment-vector calculation part (line-segment-vector calculation unit) 127 and a normal-vector calculation part (normal-vector calculation unit) 129 as units that calculate the first element vectors.

The line-segment-vector calculation part 127 divides each polygon into a plurality of triangles that are independent of each other (that neither overlap nor cross each other), and calculates line segment vectors representing line segments respectively corresponding to sides of each triangle based on coordinates of vertices of the polygon. That is, the line-segment-vector calculation part 127 divides a polygon into a plurality of triangles by connecting vertices constituting the polygon to each other with line segments that do not cross each other.

For example, the line-segment-vector calculation part 127 divides a polygon into a plurality of triangles by line segments that respectively connect a vertex set as the origin of the polygon to other vertices constituting the polygon. The line-segment-vector calculation part 127 outputs calculated line segment vectors to the normal-vector calculation part 129 and the vector management part 131 while being associated with respective polygons.

In a case where a depth image is divided into a grid mesh shape, the line-segment-vector calculation part 127 divides each grid into two triangles, and calculates line segment vectors representing line segments corresponding to sides of each triangle by using coordinates of each vertex.

Calculation of a line segment vector by the line-segment-vector calculation part 127 is described based on FIG. 4.

First, the line-segment-vector calculation part 127 calculates each of vectors U00, V00, and W00 directed from the vertex P00 set as the origin of a grid 00 to other vertices P01, P10, and P11 constituting the grid. The vector W00 corresponds to a line segment that divides the grid 00 into two triangles. The line-segment-vector calculation part 127 outputs the calculated line segment vectors U00, V00, and W00 to the normal-vector calculation part 129 and the vector management part 131 while being associated with the grid 00. The line-segment-vector calculation part 127 also performs identical processing for a grid 01 and subsequent grids.

The normal-vector calculation part 129 calculates a normal vector perpendicular to a surface of each triangle formed by the line segment vectors output from the line-segment-vector calculation part 127 based on those line segment vectors. The normal-vector calculation part 129 also outputs the calculated normal vector to the vector management part 131 while being associated with each polygon.

When a depth image is divided into a grid mesh shape, as illustrated in FIG. 4, the normal-vector calculation part 129 calculates normal vectors A and B that are perpendicular to surfaces of respective triangles based on the line segment vectors U, V, and W. The normal vector A is calculated from a cross product of the line segment vectors U and W, and the normal vector B is calculated from a cross product of the line segment vectors W and V.

As for the grid 00, the normal-vector calculation part 129 calculates a cross product of the line segment vectors U00 and W00 to obtain a surface normal vector A00 of a triangle P00P01P11, and calculates a cross product of the line segment vectors V00 and W00 to obtain a surface normal vector B00 of a triangle P00P11P10. The normal-vector calculation part 129 also outputs the calculated surface normal vectors A00 and B00 to the vector management part 131 while being associated with the grid 00. Further, the normal-vector calculation part 129 performs identical processing for the grid 01 and subsequent grids.

The normal-vector calculation part 129 may output a cross product of line segment vectors as a surface normal vector to the vector management part 131 as it is, or may change the cross product to a unit vector (normalize the cross product) and output the unit vector to the vector management part 131. Normalization described above may be performed by the vector management part 131.

<Vector Management Part>

The vector management part 139 is a unit that manages data of element vectors output from the vector calculation part 125. That is, first, the vector management part 131 extracts unique element vectors that do not overlap each other from the element vectors output from the vector calculation part 125. The vector management part 131 generates a vector list in which unique element indexes for distinguishing the unique element vectors from each other are assigned to the extracted unique element vectors. The vector list is a list in which unique indexes are associated with unique element vectors one-to-one.

Further, the vector management part 131 replaces all the element vectors output from the vector calculation part 125 with element indexes and stores the element indexes in the mesh-data storage part 141 to be respectively associated with identification information of polygons (grid numbers).

The size of a memory area required for storing indexes can be made sufficiently smaller than the size of a memory area required for storing raw data of element vectors. Therefore, in the case of storing the indexes of the element vectors in the mesh-data storage part 141 while being associated with grid numbers, it is possible to reduce the capacity of the mesh-data storage part 141 as compared with a case of storing raw data of the element vectors in the mesh-data storage part 141 while being associated with the grid numbers. Further, by setting the size of a memory area prepared for storing indexes to be as smallest as possible in accordance with the number of indexes to be generated, it is possible to reduce the capacity required for storing the indexes while optimizing the capacity.

The vector management part 131 described in this example includes a line-segment-vector management part (line-segment-vector-list generation unit) 133 and a line-segment vector list 135, as units that manage information related to line segment vectors. The vector management part 131 includes a normal-vector management part (normal-vector-list generation unit) 137 and a normal vector list 139, as units that manage information related to normal vectors.

FIG. 6A is a diagram illustrating raw data of line segment vectors output while being associated with each grid, and FIG. 6B is a diagram illustrating a line-segment vector list generated based on FIG. 6A.

FIG. 6A illustrates an example of data output by the line-segment-vector calculation part 127 to the line-segment-vector management part 133. The line-segment-vector calculation part 127 sequentially outputs calculated line segment vectors to the line-segment-vector management part 133 while being associated with respective grids (respective grid numbers).

The line-segment-vector management part 133 determines whether each line segment vector acquired from the line-segment-vector calculation part 127 is included in the line-segment vector list 135, that is, whether each line segment vector acquired from the line-segment-vector calculation part 127 is a unique line segment vector.

When the line segment vector acquired from the line-segment-vector calculation part 127 is not stored in the line-segment vector list 135, that is, when it is a unique line segment vector, the line-segment-vector management part 133 assigns a new index (a line-segment-vector index) to the acquired line segment vector and generates a line-segment vector list (FIG. 6B) in which the index and original data of the line segment vector are associated with each other.

When the line segment vector acquired from the line-segment-vector calculation part 127 matches any of line segment vectors stored in the line-segment vector list 135, that is, the acquired line segment vector is not a unique line segment vector, the line-segment-vector management part 133 extracts an index assigned to the matched line segment vector from the line-segment vector list 135, and assigns the extracted index to the line segment vector acquired from the line-segment-vector calculation part 127.

FIG. 8 is a diagram illustrating an example of mesh data stored in a mesh-data storage part. The line-segment-vector management part 133 stores an index assigned to a line segment vector in the mesh-data storage part 141 while being associated with a grid number and information indicating a position (U, V, W) of the line segment vector in the grid mesh. With the above processes, all the line segment vectors output from the line-segment-vector calculation part 127 are replaced with indexes.

FIG. 7A is a diagram illustrating raw data of a normal vector output while being associated with each grid, and FIG. 7B is a diagram illustrating a normal vector list generated based on FIG. 7A.

FIG. 7A illustrates an example of data output by the normal-vector calculation part 129 to the normal-vector management part 137. The normal-vector calculation part 129 sequentially outputs calculated normal vectors to the normal-vector management part 137 while being associated with respective grids (respective grid numbers).

The normal-vector management part 137 determines whether each normal vector acquired from the normal-vector calculation part 129 is included in the normal vector list 139, that is, whether each normal vector acquired from the normal-vector calculation part 129 is a unique normal vector.

When the normal vector acquired from the normal-vector calculation part 129 is not stored in the normal vector list 139, that is, it is a unique normal vector, the normal-vector management part 137 assigns a new index (a normal-vector index) to the acquired normal vector, and generates a normal vector list (FIG. 7B) in which the index and original data of the normal vector are associated with each other.

When the normal vector acquired from the normal-vector calculation part 129 matches any of normal vectors stored in the normal vector list 139, that is, the acquired normal vector is not a unique normal vector, the normal-vector management part 137 extracts an index assigned to the matched normal vector from the normal vector list 139, and assigns the extracted index to the normal vector acquired from the normal-vector calculation part 129.

The normal-vector management part 137 stores an index assigned to a normal vector in the mesh-data storage part 141 while being associated with a grid number and information indicating which of the normal vectors (A, B) of triangles dividing a grid mesh with the grid number the normal vector is (see FIG. 8). With the above processes, all the normal vectors output from the normal-vector calculation part 129 are replaced with indexes.

As described above, the mesh-data storage part 141 does not store therein raw data of line segment vectors and normal vectors, but stores indexes thereof. Therefore, it is possible to largely reduce the memory capacity as compared with a case of retaining raw data of line segment vectors and normal vectors for each grid. For example, as illustrated in FIGS. 2A and 2B, a wall (the object 201c) of a building that is located behind a vehicle (the object 201b) as viewed from a capturing point is a plane with a predetermined angle with respect to the capturing point. Therefore, line segment vectors and normal vectors are approximately the same (that is, X, Y, and Z values indicating vector components are approximately the same) among grid meshes in the wall, and a plurality of grid meshes use the same index. Accordingly, the memory capacity to be used is small.

When a line-segment vector list and a normal vector list are generated, the line-segment-vector management part 133 and the normal-vector management part 137 may be configured, not to assign a new index when each of X, Y, and Z values of a line segment vector or a normal vector is completely unique, but to assign a new index when each of the X, Y, and Z values falls within a certain range in determination whether the vector is unique.

That is, a sensor output from a depth camera or the like may be varied to some extent. In addition, because of the influence of rounding up, rounding down, or the like in calculation of coordinate transformation to a world space, there is a case where vectors that are different in X, Y, and Z values from each other are obtained even when those vectors should be originally the same in X, Y, and Z values as each other. In this case, the same index is assigned to vectors that are slightly different from each other in X, Y, Z values, where differences of the X, Y, and Z values are in a predetermined threshold range. Such assignment further reduces the memory capacity. The threshold described above can be set in accordance with the use application of a depth image as appropriate. Further, for example, the threshold described above can be set by using X, Y, and Z values of a vector to which an index is assigned first as a reference.

When line segment vectors having different components are regarded as the same line segment vectors and the same index is assigned to those line segment vectors to consolidate data, a three-dimensional space is not reproduced with high fidelity. However, such consolidation of line segment vectors that are different from each other strictly to the same index causes no practical problem because, in a case where processing of depth information according to the present invention is applied to obstacle detection implemented on an automobile or the like, detection as to whether there is any obstacle is more important than accurate recognition of the shape of the obstacle.

[Flowchart]

Figure 9:
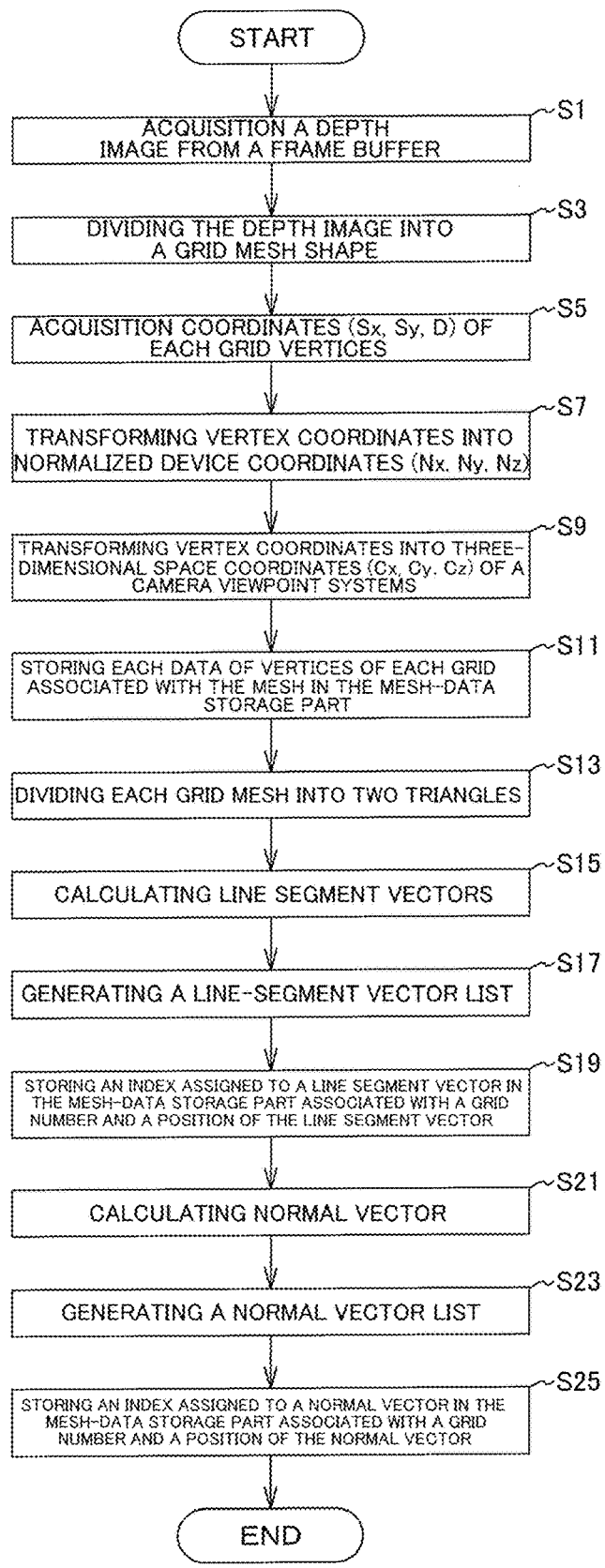
FIG. 9 is a flowchart illustrating an image processing procedure performed by the image processing apparatus according to the first embodiment of the present invention.

FIG. 9 is a flowchart illustrating an image processing procedure performed by the image processing apparatus according to the first embodiment of the present invention. This procedure is described below by way of example in which a depth image is divided into a quadrilateral grid mesh that is an example of a polygon mesh.

At Step S1, the vertex-data acquisition part 117 acquires a depth image (FIG. 2B) from the frame buffer 115.

At Step S3, the vertex-data acquisition part 117 divides the depth image illustrated in FIG. 2B into a grid mesh shape in accordance with a mesh setting parameter acquired from the mesh setting part 111 (image dividing step). The vertex-data acquisition part 117 assigns grid numbers for identifying grid meshes formed by division to the respective grid meshes.

At Step S5, the vertex-data acquisition part 117 acquires screen coordinates (Sx, Sy) and the depth values D of pixels located at vertices of each grid obtained by division as vertex coordinates (vertex-data acquiring step). The screen coordinates are values expressed by using the width and height (unit: pixel) of the depth image as a reference. For example, for a depth image of 480×640 pixels, Sx and Sy are expressed by integer values in ranges of 0≤Sx≤479 and 0≤Sy≤639, respectively. The depth value D is a real number value that has a value normalized in a range from 0 to 1. The vertex-data acquisition part 117 associates vertex coordinates of an upper left vertex of each grid with a grid number by regarding the vertex as the origin of the grid.

At Step S7, the normalization part 121 transforms vertex coordinates (Sx, Sy, D) of each vertex into normalized device coordinates (Nx, Ny, Nz) (coordinate transforming step). That is, the normalization part 121 transforms an X-coordinate and a Y-coordinate (Sx, Sy) of the vertex coordinates of each vertex into coordinates (Nx, Ny)

expressed by real number values that are normalized in a range from −1 to +1 by using the image width and the image height, respectively. The normalization part 121 also transforms the depth value D into a coordinate Nz expressed by a real number normalized in a range from −1 to +1. With this coordinate transformation, each vertex is arranged inside a cube having a side of a length of 2.

At Step S9, the inverse-projective transformation part 123 performs inverse projective transformation (inverse projection transformation) for normalized three-dimensional space coordinates (Nx, Ny, Nz) of each vertex to transform the coordinates of each vertex into three-dimensional space coordinates (Cx, Cy, Cz) in a camera viewpoint system that uses the viewpoint of the depth camera 10A as a reference (camera viewpoint system coordinates or viewing coordinates (coordinate transforming step, FIGS. 5A and 5B). With this process, an object taken in the depth image is expressed with the original three-dimensional shape. That is, this process reproduces a world space by coordinates that use a camera viewpoint as a reference.

At Step S11, the inverse-projective transformation part 123 stores data in which a grid number and three-dimensional space coordinates (Cx, Cy, Cz) of vertices of each grid are associated with each other in the mesh-data storage part 141 (FIGS. 4 and 8). The inverse-projective transformation part 123 outputs the data to the line-segment-vector calculation part 127.

At Step S13, the line-segment-vector calculation part 127 divides each grid mesh into two triangles.

At Step S15, the line-segment-vector calculation part 127 calculates line segment vectors U, V, and W that represent sides of each triangle based on three-dimensional space coordinates (Cx, Cy, Cz) of each vertex (vector calculating step, FIG. 4). The line-segment-vector calculation part 127 outputs the line segment vectors U, V, and W to the line-segment-vector management part 133 and the normal-vector calculation part 129.

At Step S17, the line-segment-vector management part 133 assigns a new index to a unique line segment vector and generates a line-segment vector list in which the index and an original value of the line segment vector are associated with each other (vector-list generating step, FIGS. 6A and 6B). Further, with regard to a line segment vector that overlaps a line segment vector included in the line-segment vector list 135, the line-segment-vector management part 133 assigns a corresponding index in the line-segment vector list 135. With this process, all the line segment vectors output from the line-segment-vector calculation part 127 are replaced with indexes.

At Step S19, the line-segment-vector management part 133 stores an index assigned to a line segment vector in the mesh-data storage part 141 while being associated with a grid number and a position (U, V, W) of the line segment vector in a grid mesh with the grid number (mesh-data storing step, FIG. 8).

At Step S21, the normal-vector calculation part 129 calculates surface normal vectors A and B of respective triangles based on the line segment vectors (U, V, W) (vector calculating step, FIG. 4). The normal-vector calculation part 129 outputs the surface normal vectors A and B to the normal-vector management part 137.

At Step S23, the normal-vector management part 137 assigns a new index to a unique normal vector and generates a normal vector list in which the index and an original value of the normal vector are associated with each other (vector-list generating step, FIGS. 7A and 7B). Further, with regard to a normal vector that overlaps a normal vector included in the normal vector list 139, the normal-vector management part 137 assigns a corresponding index in the normal vector list 139. With this process, all the normal vectors output from the normal-vector calculation part 129 are replaced with indexes.

At Step S25, the normal-vector management part 137 stores an index assigned to a normal vector in the mesh-data storage part 141 while being associated with a grid number and information indicating which of normal vectors (A, B) of triangles dividing a grid mesh the normal vector is (mesh-data storing step, FIG. 8).

<Effects>

As described above, according to the first embodiment, an image is divided into a plurality of polygons and data of each vertex of the polygons is acquired. Therefore, it is possible to efficiently acquire information required for calculation performed later, so that the calculation amount and the capacity required for storing data can be reduced.

Further, depth information obtained from a depth image is converted into geometry information (vector information). Therefore, the efficiency of various types of calculation using the depth information converted into the vector information is improved. For example, surface normal vectors are required for determining a collision between a plurality of subjects taken in the depth image. By calculating the surface normal vectors in advance as in the first embodiment, calculation efficiency for collision determining is improved.

Further, the vector information is put into a list by using unique values, and therefore the amount of information can be largely reduced as compared with a case of retaining raw data for all vectors. Accordingly, it is possible to reduce the memory capacity required for storing the depth information.

Further, by normalizing the vector information and then putting it into a list by using unique values, the memory capacity required for storing the depth information can be further reduced. Particularly, magnitude information of a surface normal vector is not required in collision determination. In this case, changing a vector to a unit vector (or normalization) can reduce the number of unique vectors, so that the memory capacity required for storing the depth information can be reduced.

Three-dimensional space coordinates (Cx, Cy, Cz) of all vertices can be calculated from three-dimensional coordinates (Cx, Cy, Cz) of at least one vertex and line segment vectors that indicate relations between vertices. Therefore, it suffices that the three-dimensional space coordinates (Cx, Cy, Cz) of at least one of all the vertices are stored in the mesh-data storage part 141.

Directions of the line segment vectors U, V, and W described in the first embodiment are merely an example, but may be opposite directions. Further, a diagonal (the vector W) that divides each grid into two triangles may be directed to the lower right (or the upper left) as illustrated in FIG. 4 or may be directed to the lower left (or the upper right).

A line-segment vector list and a normal vector list may be put into one. That is, a vector list may be generated in which an index is assigned to a unique vector extracted from all line segment vectors and all normal vectors.

The line-segment-vector management part 133 may generate a list that specifies each line segment vector based on two elements that are the magnitude and the direction. That is, the line-segment-vector management part 133 may generate a size list in which line segment vectors are listed by unique magnitudes and a unit-line-segment-vector list in which line segment vectors are listed by unique angles.

A three-dimensional space (a coordinate system) that is intermediately or finally calculated based on a depth image is not limited to that described in the first embodiment, but can be arbitrarily selected in accordance with the purpose.

Second Embodiment

Figure 10:
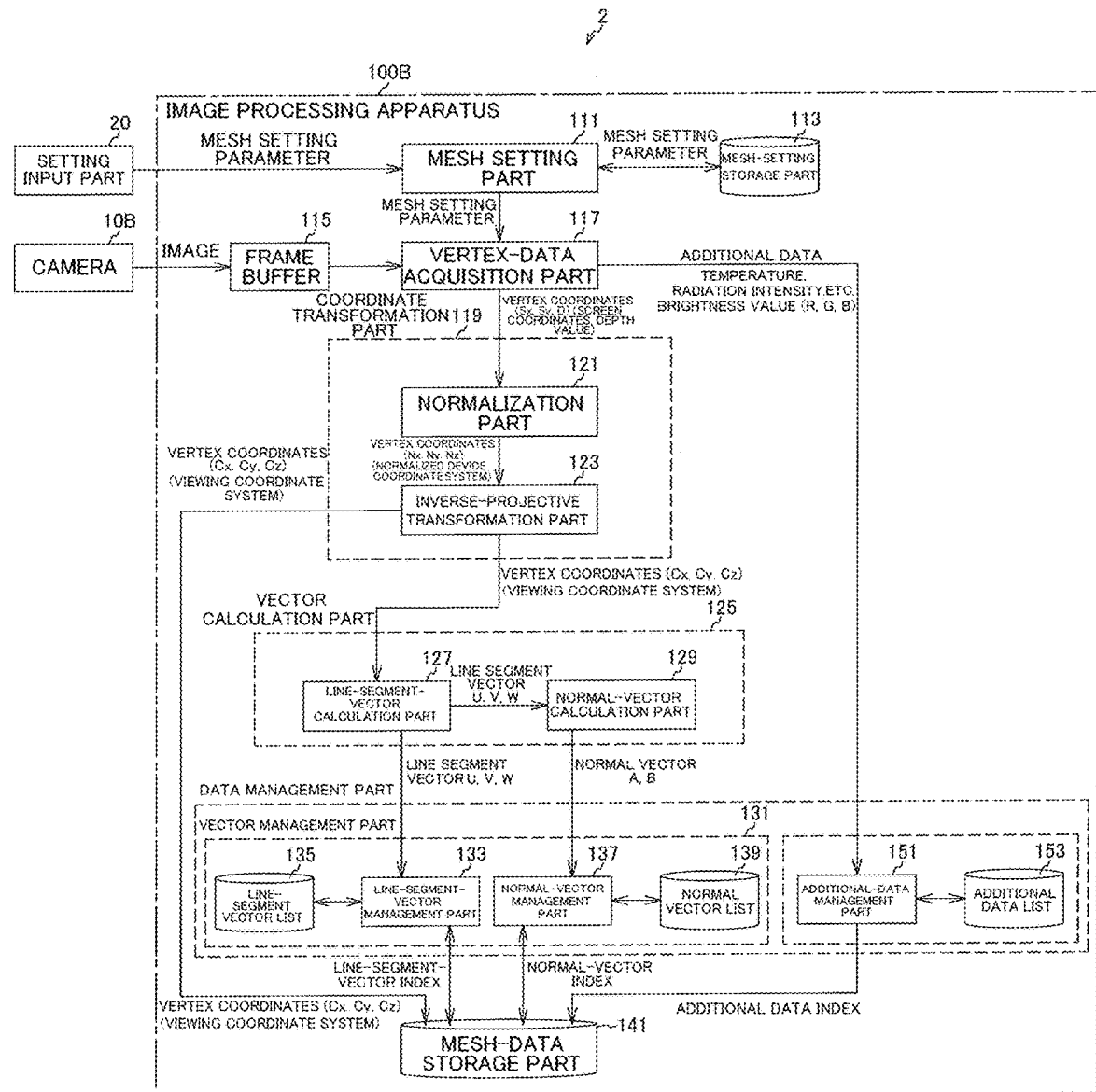
FIG. 10 is a block configuration diagram illustrating an image processing system including an image processing apparatus according to a second embodiment of the present invention.

FIG. 10 is a block configuration diagram illustrating an image processing system including an image processing apparatus according to a second embodiment of the present invention.

In the following descriptions, identical parts as those in the first embodiment are denoted by like reference signs and features different from the first embodiment are mainly described. The image processing apparatus according to the second embodiment has a characteristic in acquiring information different from depth information from a camera and processing the information.

A camera 10B that constitutes an image processing system 2 includes a sensor that acquires additional information in addition to a sensor that acquires depth information, and generates an image including the depth information and the additional information. In addition to a depth value, the additional information (additional data such as a brightness value, a temperature, and a radiation intensity) is associated with each pixel of an image output by the camera 10B.

As a function of acquiring the additional information, for example, the camera 10B has a function of acquiring brightness information (a gray scale, or brightness information (color information) for each of Red, Green, and Blue) of a visible light image of a subject, a function of acquiring a temperature distribution of the subject (such as a function as an infrared thermography camera), a radiation measuring function of acquiring a spatial intensity distribution of a radiation (such as a function as a Compton camera), and a function of acquiring another spatial information of the subject.

The frame buffer 115 of an image processing apparatus 100B temporarily retains an image input from the camera 10B. The frame buffer 115 is a memory area that is prepared for storing a depth value and additional data included in each pixel of the image.

The vertex-data acquisition part 117 divides an image acquired from the frame buffer 115 into a mesh shape by using a plurality of polygons in accordance with a mesh setting parameter, and gives each polygon generated by division identification information for identifying it. The vertex-data acquisition part 117 acquires vertex coordinates and additional data of pixels located at vertices of each polygon, and associates the vertex coordinates and the additional data with identification information of the polygon.

The image processing apparatus 100B includes the vector management part 131 that manages line segment vectors and normal vectors, an additional-data management part (additional-data-list generation unit) 151 that manages additional data, and an additional data list 153 that is a list related to the additional data.

The additional-data management part 151 is operated in an identical manner to the vector management part 131. That is, the additional-data management part 151 assigns a new index (an additional data index) to unique additional data in additional data input from the vertex-data acquisition part 117, and generates the additional data list 153 in which the index and the unique additional data are associated with each other. Further, with regard to additional data that overlaps additional data included in the additional data list 153, the additional-data management part 151 assigns a corresponding index in the additional data list 153. With this process, all units of additional data input from the vertex-data acquisition part 117 are replaced with indexes.

The additional-data management part 151 stores the index assigned to the additional data in the mesh-data storage part 141 while being associated with the identification information of the polygon.

As described above, according to the second embodiment, it is possible to reduce the amount of data stored in a mesh-data storage unit by assigning an index to unique additional data and put it into a list.

The image processing apparatus 100B may include an additional-data conversion part as a unit that converts additional information output from the vertex-data acquisition part 117 into a mode that can be easily used later (such as normalized data) in advance, in the preceding stage of the additional-data management part 151. With this configuration, it is possible to omit calculation required when additional data is used, and reduction of a processing load of an image processing apparatus and high-speed processing can be realized.

Further, the image processing apparatus 100B may be configured to handle a set of the same type of additional data as one element vector (a second element vector). For example, R, G, and B brightness values that are expressed by color vectors in various types of color systems may be handled as one color vector.

[Outline of Actions and Effects of Aspects of Present Invention]

<First Aspect>

The present aspect is an image processing apparatus 100 that processes an image including depth information in each pixel, and has a characteristic in including an image division unit (the vertex-data acquisition part 117) that divides the image into a mesh shape of a plurality of polygons, a vertex-data acquisition unit (the vertex-data acquisition part 117) that acquires depth information and an X-coordinate and a Y-coordinate on the image that are associated with each vertex of each polygon as first coordinates of the vertex, a coordinate transformation unit (the coordinate transformation part 119) that transforms first coordinates of each vertex into three-dimensional space coordinates expressed by a predetermined coordinate system, a vector calculation unit (the vector calculation part 125) that calculates element vectors (line segment vectors and normal vectors) that constitute each polygon based on the three-dimensional space coordinates of each vertex, a vector-list generation unit (the vector management part 131) that assigns element indexes for distinguishing unique element vectors from each other to the respective unique element vectors, and generates a vector list in which the unique element vectors and the element indexes are respectively associated with each other, and a mesh-data storage unit (the mesh-data storage part 141) that stores therein element indexes of element vectors that constitute each polygon, while being associated with the polygon.

The image processing apparatus according to the present aspect processes a depth image in which a depth value as the depth information is associated with each pixel.

The image division unit may divide the image into a quadrilateral grid shape (a rectangle) or into polygons other than a quadrilateral grid shape.

As for a pixel corresponding to a vertex of a polygon generated by division, the vertex-data acquisition unit acquires the X-coordinate Sx and the Y-coordinate Sy on the image, and also acquires the depth information (the depth value D) recorded in the pixel. The depth information is information indicating a distance from the camera viewpoint of a depth camera that captures the image to a subject. The vertex-data acquisition unit acquires three coordinates (the first coordinates) that can restore a world space from at least the depth image.

The coordinate transformation unit calculates three-dimensional space coordinates that express the world space that is an orthogonal coordinate system, for example, based on the first coordinates. When calculating the three-dimensional space coordinates, the coordinate transformation unit sets an optimum coordinate system in accordance with the contents of an arithmetic process that will be performed later, and sets an optimum reference point.

The vector calculation unit calculates the element vectors that constitute each polygon based on the three-dimensional space coordinates of each vertex. The vector calculation unit transforms in advance the three-dimensional space coordinates into element vectors (geometry information) in a mode that will be used in subsequent calculation. Examples of the element vector include a line segment vector representing a line segment of a polygon, a surface normal vector representing a normal with respect to a surface of a polygon, and a vertex normal vector representing a normal on a vertex of a polygon. The line segment vector is an example of geometry information describing a relation between vertices.

The vector-list generation unit generates the vector list, thereby assigning a common element index to the same element vectors.

The mesh-data storage unit stores therein an element index associated with each element vector. It is possible to reduce the capacity required for storing data, as compared with a case of storing raw data of the element vector.

In the present aspect, an image is divided into a plurality of polygons and data of respective vertices of the polygons are acquired, and thus it is possible to efficiently acquire information required for calculation performed later, thereby reducing the amount of calculation and the capacity required for storing data.

That is, in some usage fields of an image including depth information, it suffices that depth information of some pixels is available, and there are cases where depth information of all the pixels is not required. For example, in determination of a collision between objects taken in an image, it suffices that the shapes of the objects and a positional relation between the objects can be recognized to such an extent that collision determination is possible. As described in the present aspect, by dividing an image into a plurality of polygons and acquiring data of pixels corresponding to respective vertices, it is possible to efficiently process data.

Further, in the present aspect, three-dimensional space coordinates obtained from an image are converted into element vectors that are geometry information, and thus it is possible to improve the efficiency of various types of calculation using depth information.

For example, when collision between objects is determined by using unprocessed depth information, performing ray casting to perform calculation (setting a virtual straight line for collision determination to perform calculation) every time increases the amount of calculation to a very large amount, and it is inefficient. In addition, while collision determination requires normal vectors, it does not require information regarding the magnitudes of the normal vectors. As described above, unprocessed depth information may include information that is not required for calculation in some usage modes of depth information. By converting depth information or the like to geometry information in a mode used in calculation performed later in advance as described in the present aspect, it is possible to reduce the amount of calculation performed later and to improve efficiency.

<Second Aspect>

In the image processing apparatus 100 according to the present aspect, the coordinate transformation unit (the coordinate transformation part 119) has a characteristic in including an inverse-projective transformation unit (the inverse-projective transformation part 123) that performs inverse projective transformation for coordinates of each vertex based on viewing angle information of the depth camera 10 having captured the image, an aspect ratio of the image, and a clip distance that indicates a depth range captured by the depth camera so as to generate three-dimensional space coordinates (Cx, Cy, Cz) expressed by a viewing coordinate system that uses a specific viewpoint as a reference (an origin), as three-dimensional space coordinates of the vertex.

The image captured by the depth camera is a screen image in which an object is expressed with a size depending on the depth. When depth information is included in each pixel of the image, it is possible to restore a world space expressed by a three-dimensional orthogonal coordinate system by performing inverse projective transformation based on an X-Y coordinate on the image of each pixel, the depth information recorded in each pixel, and information regarding the capturing range of the depth camera. In the world space, the object is reproduced as a three-dimensional object having an original size (with the same dimensions or without including distortion in accordance with the depth).

The restored world space may be a three-dimensional coordinate space of a viewing coordinate system (a camera coordinate system) expressed by using the viewpoint of the depth camera as a reference point (an origin) or may be expressed by using another point as the reference point.

<Third Aspect>

In the image processing apparatus 100 according to the present aspect, the coordinate transformation unit (the coordinate transformation part 119) has a characteristic in including a normalization unit (the normalization part 121) that normalizes coordinates of each vertex to generate three-dimensional space coordinates (Nx, Ny, Nz) expressed in a normalized device coordinate system as three-dimensional space coordinates of the each vertex, and the inverse-projective transformation unit (the inverse-projective transformation part 123) performs inverse projective transformation for the three-dimensional space coordinates of each vertex expressed by the normalized device coordinate system to generate three-dimensional space coordinates (Cx, Cy, Cz) expressed in a viewing coordinate system (to be exact, a camera coordinate system) that uses a specific viewpoint as a reference (an origin).

The normalized device coordinate system is a coordinate system that reproduces an object in a screen image, in a cube having a side of a length 2, for example. By using the normalized device coordinate system as an intermediary, calculation for restoring a world space can be made easier.

<Fourth Aspect>

The image processing apparatus 100 according to the present aspect has a characteristic such that the mesh-data storage unit (the mesh-data storage part 141) stores therein three-dimensional space coordinates with regard to at least one of vertices of a plurality of polygons.

The three-dimensional space coordinates described here represent raw coordinate data. If raw coordinate data is known with regard to at least one of vertices of the polygons set on the image, it is possible to calculate raw coordinate data with regard to other vertices based on geometry information (vector information) describing relations between vertices. In this manner, it suffices that the three-dimensional space coordinates are stored in the mesh-data storage unit with regard to at least one vertex. In this case, it is possible to largely reduce the amount of data stored in the mesh-data storage unit.

If raw coordinate data of one vertex for every polygon is stored in the mesh-data storage unit as a vertex that represents the polygon, various types of calculation can be performed for every polygon independently of other polygons (parallel processing can be performed), so that the calculation efficiency is improved.

<Fifth Aspect>

In the image processing apparatus 100 according to the present aspect, the vector calculation unit (the vector calculation part 125) has a characteristic in including a line-segment-vector calculation unit (the line-segment-vector calculation part 127) that divides each polygon into a plurality of triangles and calculates line segment vectors (U, V, W) that express sides of each triangle, and a normal-vector calculation unit (the normal-vector calculation part 129) that calculates normal vectors (the surface normal vectors A and B) of the respective triangles based on the line-segment vectors.

For example, determination of a collision between objects present in a world space reproduced based on an image requires normal vectors of triangles. By calculating in advance element vectors in a mode that will be used in calculation performed later, the efficiency of calculation performed later can be improved.

<Sixth Aspect>

In the image processing apparatus 100 according to the present aspect, the vector-list generation unit (the vector management part 131) has a characteristic in including a line-segment-vector-list generation unit (the line-segment-vector management part 133) that assigns line-segment vector indexes for distinguishing unique line segment vectors from each other to the respective unique line segment vectors, and generates a line-segment vector list in which the unique line segment vectors and the line-segment-vector indexes are respectively associated with each other, and a normal-vector-list generation unit (the normal-vector management part 137) that assigns normal vector indexes for distinguishing unique normal vectors from each other to the respective unique normal vectors to the unique normal vectors, and generates a normal vector list in which the unique normal vectors and the normal vector indexes are respectively associated with each other.

Since the vector-list generation unit generates a vector list in which the indexes are respectively assigned to the unique line segment vectors and the unique normal vectors, it is possible to reduce the amount of data stored in the mesh-data storage unit.

<Seventh and Eighth Aspects>

An image processed by the image processing apparatus 10B according of the present aspects includes additional data that is different from depth information (a value that can be expressed in a numerical form, such as a brightness value, a temperature, and a radiation intensity) in each pixel.

In the image processing apparatus according to the present aspects, the vertex-data acquisition unit (the vertex-data acquisition part 117) acquires additional data corresponding to vertices of each polygon. The image processing apparatus includes an additional-data-list generation unit (the additional-data management part 151) that assigns additional data indexes for identifying a plurality of units of unique additional data to the respective units of unique additional data and generates an additional data list in which the units of unique additional data and the additional data indexes are respectively associated with each other. The mesh-data storage unit (the mesh-data storage part 141) stores therein additional data indexes of additional data corresponding to vertices of each polygon, while being associated with the polygon.

The image processing apparatus according to the present aspects has a characteristic such that the additional data includes any of color information, temperature information, and radiation information of a subject captured in an image.

As in the present aspect, each pixel of the image may include data other than depth information (additional data). Also in this case, similarly to element vectors, the additional-data list generation unit generates an additional-data list in which indexes are respectively assigned to the units of unique additional data, and thus it is possible to reduce the amount of data stored in the mesh-data storage unit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus that processes an image including depth information in each pixel, the image processing apparatus comprising:
   an image division unit that divides the image into a mesh shape of a plurality of polygons;
   a vertex-data acquisition unit that acquires the depth information and an X-coordinate and a Y-coordinate on the image that are associated with each vertex of each of the polygons as first coordinates of the each vertex;
   a coordinate transformation unit that transforms the first coordinates of the each vertex into three-dimensional space coordinates expressed by a predetermined coordinate system;
   a vector calculation unit that calculates element vectors that constitute each of the polygons based on the three-dimensional space coordinates of the each vertex;
   a vector-list generation unit that respectively assigns, to unique element vectors among the element vectors, element indexes for distinguishing the unique element vectors from each other so as to generate a vector list in which the unique element vectors and the element indexes are respectively associated with each other; and
   a mesh-data storage unit that stores therein the element indexes of the element vectors that constitute the each polygon, while being associated with the each polygon.

2. The image processing apparatus according to claim 1, wherein the coordinate transformation unit includes an inverse-projective transformation unit that performs inverse projective transformation for the coordinates of the each vertex based on viewing angle information of a depth camera having captured the image, an aspect ratio of the image, and a clip distance that indicates a depth range to be captured by the depth camera so as to generate three-dimensional space coordinates expressed by a viewing coordinate system that uses a specific viewpoint as a reference, as the three-dimensional space coordinates of the each vertex.

3. The image processing apparatus according to claim 2, wherein
the coordinate transformation unit includes a normalization unit that normalizes coordinates of the each vertex to generate three-dimensional space coordinates expressed by a normalized device coordinate system as the three-dimensional space coordinates of the each vertex, and
the inverse-projective transformation unit performs inverse projective transformation for the three-dimensional space coordinates of the each vertex expressed by the normalized device coordinate system.

4. The image processing apparatus according to claim 1, wherein the mesh-data storage unit stores therein the three-dimensional space coordinates with regard to at least one of vertices of the polygons.

5. The image processing apparatus according to claim 1, wherein the vector calculation unit includes a line-segment-vector calculation unit that divides the each of the polygons into a plurality of triangles and calculates line segment vectors that represent sides of each of the triangles, and a normal-vector calculation unit that calculates a normal vector of the each of the triangles based on the line segment vectors.

6. The image processing apparatus according to claim 5, wherein
the vector-list generation unit includes
a line-segment-vector-list generation unit that assigns, to unique ones of the line segment vectors, line-segment vector indexes for distinguishing the unique line segment vectors from each other, and generates a line-segment vector list in which the unique line segment vectors and the line-segment vector indexes are respectively associated with each other, and
a normal-vector-list generation unit that assigns, to unique ones of the normal vectors, normal vector indexes for distinguishing the unique normal vectors from each other, and generates a normal vector list in which the unique normal vectors and the normal vector indexes are respectively associated with each other.

7. The image processing apparatus according to claim 1, wherein
the each pixel of the image includes additional data that is different from the depth information,
the vertex-data acquisition unit acquires the additional data associated with the each vertex of the each of the polygons,
the image processing apparatus further comprises an additional-data list generation unit that assigns, to unique units of the additional data, additional data indexes for distinguishing the unique units of the additional data from each other, and generates an additional data list in which the unique units of the additional data and the additional data indexes are respectively associated with each other, and
the mesh-data storage unit stores therein the additional data index of the additional data associated with the each vertex of the each polygon, while being associated with the each polygon.

8. The image processing apparatus according to claim 7, wherein the additional data includes any of color information, temperature information, and radiation information of a subject captured in the image.

9. An image processing method of processing an image including depth information in each pixel; the image processing method comprising:
an image dividing step of dividing the image into a mesh shape of a plurality of polygons;
a vertex-data acquiring step of acquiring the depth information and an X-coordinate and a Y-coordinate on the image that are associated with each vertex of each of the polygons, as first coordinates of the each vertex;
a coordinate transforming step of transforming the first coordinates of the each vertex into three-dimensional space coordinates expressed by a predetermined coordinate system;
a vector calculating step of calculating element vectors that constitute the each of the polygons based on the three-dimensional space coordinates of the each vertex;
a vector-list generating step of assigning, to unique element vectors among the element vectors, element indexes for distinguishing the unique element vectors from each other, and generating a vector list in which the unique element vectors and the element indexes are respectively associated with each other; and
a mesh-data storing step of storing the element indexes of the element vectors that constitute the each polygon, while being associated with the each polygon.

10. A non-transitory storage device storing an image processing program causing a computer to function as:
an image division unit that divides an image including depth information in each pixel into a mesh shape of a plurality of polygons;
a vertex-data acquisition unit that acquires the depth information and an X-coordinate and a Y-coordinate on the image that are associated with each vertex of each of the polygons as first coordinates of the each vertex;
a coordinate transformation unit that transforms the first coordinates of the each vertex into three-dimensional space coordinates expressed by a predetermined coordinate system;
a vector calculation unit that calculates element vectors that constitute each of the polygons based on the three-dimensional space coordinates of the each vertex;
a vector-list generation unit that respectively assigns, to unique element vectors among the element vectors, element indexes for distinguishing the unique element vectors from each other so as to generate a vector list in which the unique element vectors and the element indexes are respectively associated with each other; and
a mesh-data storage unit that stores therein the element indexes of the element vectors that constitute the each polygon, while being associated with the each polygon.

* * * * *